(12) United States Patent
Hansson et al.

(10) Patent No.: US 9,686,467 B2
(45) Date of Patent: *Jun. 20, 2017

(54) PANORAMIC VIDEO

(71) Applicant: Sony Corporation, Tokyo (JP)

(72) Inventors: Mikael Hansson, Kävlinge (SE);
Staffan Björklund, Lund (SE);
Markus Agevik, Malmö (SE); Magnus Lindhe, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,696

(22) Filed: Aug. 15, 2014

(65) Prior Publication Data

US 2016/0050366 A1 Feb. 18, 2016

(51) Int. Cl.
| | |
|---|---|
| *H04N 5/77* | (2006.01) |
| *H04N 5/232* | (2006.01) |
| *H04N 9/802* | (2006.01) |
| *G11B 27/30* | (2006.01) |
| *H04N 21/218* | (2011.01) |
| *H04N 21/422* | (2011.01) |
| *H04N 21/4223* | (2011.01) |

(52) U.S. Cl.
CPC ......... *H04N 5/23238* (2013.01); *G11B 27/30* (2013.01); *H04N 5/77* (2013.01); *H04N 9/802* (2013.01); *H04N 21/21805* (2013.01); *H04N 21/4223* (2013.01); *H04N 21/42203* (2013.01)

(58) Field of Classification Search
None
See application file for complete search history.

(56) References Cited

U.S. PATENT DOCUMENTS

| | | | |
|---|---|---|---|
| 2006/0028542 A1* | 2/2006 | Rondinelli | H04N 5/23238 348/36 |
| 2006/0164552 A1 | 7/2006 | Cutler | |
| 2010/0248704 A1* | 9/2010 | Pavel | H04M 1/6025 455/416 |
| 2012/0182429 A1 | 7/2012 | Forutanpour et al. | |
| 2013/0057546 A1* | 3/2013 | Watanabe | G06T 3/4038 345/419 |
| 2014/0140684 A1* | 5/2014 | Imanishi | G02B 27/646 396/55 |

OTHER PUBLICATIONS

Lee, Dar-Shyang et al.: "Portable Meeting Recorder", ACM Multimedia 2002, , Dec. 1-6, 2002, pp. 493-502, XP040145786, Juan-Les-Pins, France.
Zhang, Cha et al.: "Boosting-Based Multimodal Speaker Detection for Distributed Meeting Videos", IEEE Transactions on Multimedia, IEEE Service Center, Piscataway, NJ, US, vol. 10, No. 8, Dec. 1, 2008, pp. 1541-1552, XP011239296, ISSN: 1520-9210.
International Search Report and Written Opinion; Mar. 16, 2015, issued in International Patent Application No. PCT/EP2015/051116.

* cited by examiner

*Primary Examiner* — Eileen Adams
(74) *Attorney, Agent, or Firm* — James C. Edwards; Moore & Van Allen, PLLC (57) ABSTRACT

A direction of a sound source located in the surrounding of a detector of a panoramic video is established. A preset view of the panoramic video is determined based on the established direction. Playback of the panoramic video is based on the determined preset view.

18 Claims, 5 Drawing Sheets

FIG. 7

PANORAMIC VIDEO

FIELD OF THE INVENTION

Various embodiments relate to a method of processing a panoramic video, a method of playing back a panoramic video, and to corresponding devices. In particular, various embodiments relate to techniques of determining a view of the panoramic video based on a direction of sound source.

BACKGROUND OF THE INVENTION

Detectors are known which are capable of capturing a panoramic video, i.e., a video which images a significant part of a surrounding of the detector.

Sometimes, it may be desirable to play back the panoramic video on a size-limited display device such as a conventional two-dimensional (2d) screen with a limited resolution. In such a case, it is possible that parts of the panoramic video need to be cropped and thereby omitted from the playback. It is also possible that the panoramic video gets warped or distorted at playback to fit the dimensions of the 2d screen.

Such effects limit the quality of the playback. Further, information relevant for the user may be lost.

SUMMARY OF THE INVENTION

Therefore, a need exists to provide techniques which address at least some of these shortcomings. In particular, there is a need to provide techniques which enable comfortable play back of a panoramic video on size-limited display devices.

According to an aspect, a method of processing a panoramic video is provided. The method comprises retrieving video data of a panoramic video. The panoramic video images a first part of a surrounding of a detector. The method further comprises establishing a direction of a sound source located in the surrounding of the detector of the panoramic video. The method further comprises determining control data indicating a preset view of the panoramic video based on the establishing of the direction of the sound source. The preset view images a second part of the surrounding of the detector. The first part includes the second part.

According to a further aspect, a device is provided. The device comprises a processor configured to retrieve video data of a panoramic video. The panoramic video images a first part of a surrounding of a detector of the panoramic video. The processor is further configured to establish a direction of a sound source located in the surrounding of the detector. The processor is further configured to determine control data indicating a preset view of the panoramic video based on said establishing of the direction of the sound source. The preset view images a second part of the surrounding of the detector. The first part includes the second part.

According to a further aspect, a method of playing back a panoramic video is provided. The method comprises retrieving video data of a panoramic video. The method further comprises retrieving control data indicating a preset view of the panoramic video. The preset view relates to a direction of a sound source located in a surrounding of a detector of the panoramic view. The method further comprises determining a view of the panoramic video based on the preset view. The method further comprises playing back the panoramic video employing the determined view.

According to a further aspect, a device is provided. The device comprises a processor configured to retrieve video data of the panoramic video. The processor is further configured to retrieve control data indicating a preset view of the panoramic video. The preset view relates to a direction of a sound source located in a surrounding of a detector of the panoramic view. The device is further configured to determine a view of the panoramic video based on the preset view. The processor is further configured to play back the panoramic video employing the determined view.

According to a preferred embodiment of the invention, the above described methods may be performed in real time, i.e., live ***during the recording or capturing of the panoramic video, so that the preset view or the determined view are adjusted or adapted accordingly as soon as a sound source appears in the surrounding of the detector.

Furthermore, according to an embodiment of the invention, the device may be a mobile electronic device, e.g., a mobile phone, a smart phone, a portable digital camera, etc.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION OF PREFERRED EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof.

The features of the various embodiments may be combined with each other, unless specifically noted otherwise.

Hereinafter, techniques of processing a panoramic video and of playing back a panoramic video are illustrated. In particular, techniques are illustrated which employ a direction of sound source in the panoramic video. A particular view for playing back the panoramic video can be determined based on the direction of the sound source.

A sound source may an object which emits sound waves at a signal level comparably higher than objects or space in the surrounding of the sound source. E.g., a speaker, people or animals, machines, etc. may act as sound sources. In the panoramic video, these sound sources may be located at a distinct direction. Generally, there may be one sound source in the panoramic video or a larger number of sound sources.

The direction may be expressed in a reference coordinate system. The reference coordinate system may be defined in terms of the video data; e.g., a zero direction may correspond to a pixel having pixel indices 0,0 of a pixel matrix of a display device and the respective video data; such a pixel may be located at the uppermost left position of the pixel matrix. The reference coordinate system may also be defined with respect to a detector of the panoramic video; e.g., a zero direction of the reference coordinate system may correspond to a pixel of the panoramic video associated with a straightforward direction of the detector. The reference coordinate system may be defined in terms of Cartesian coordinates. The reference coordinate system may also be defined in terms of polar coordinates. E.g., a first angle may used to specify the direction parallel to the Horizon (polar angle). E.g., a second angle may be used to specify the direction perpendicular to the Horizon (azimuthal angle). The reference coordinate system may also be defined in terms of pixels of the video data. E.g., it may be possible to specify the direction in terms of pixel addresses of video data providing the panoramic video. As can be seen, various reference coordinate systems may be suitable.

In order to determine the view, control data indicating a preset view may be determined. The control data may be provided together with the video data of the panoramic video. Then, the playback of the panoramic video is based on the video data and is further based on the control data.

The preset view may correlate with the direction of the sound source. E.g., the preset view may be centered on the direction of the sound source. It is also possible that the preset view is offset by a predefined amount with respect to the established direction. In other words and more generic, the preset view may fulfill some predefined geometric criterion with respect to the established direction of the sound source.

Then, based on the control data, the view can be determined. Sometimes, it may be preferable that the view includes the direction of the sound source; i.e., the view may be determined such that—when playing back the panoramic video employing the view—the sound source is visible. Sometimes, however, it may be preferable that the view and the direction of the sound source fulfill a different geometrical criterion. Therefore, while the control data may indicate the preset view which fulfills some predefined geometric criterion with respect to the direction of the sound source, it is possible that the view used for playback of the panoramic video is flexibly determined based on the preset view. This increases the flexibility in playing back the panoramic video; nonetheless, the playback takes into account the direction of the sound source. In a simple scenario, the preset view and the view for playback may be coincident.

Figure 1:
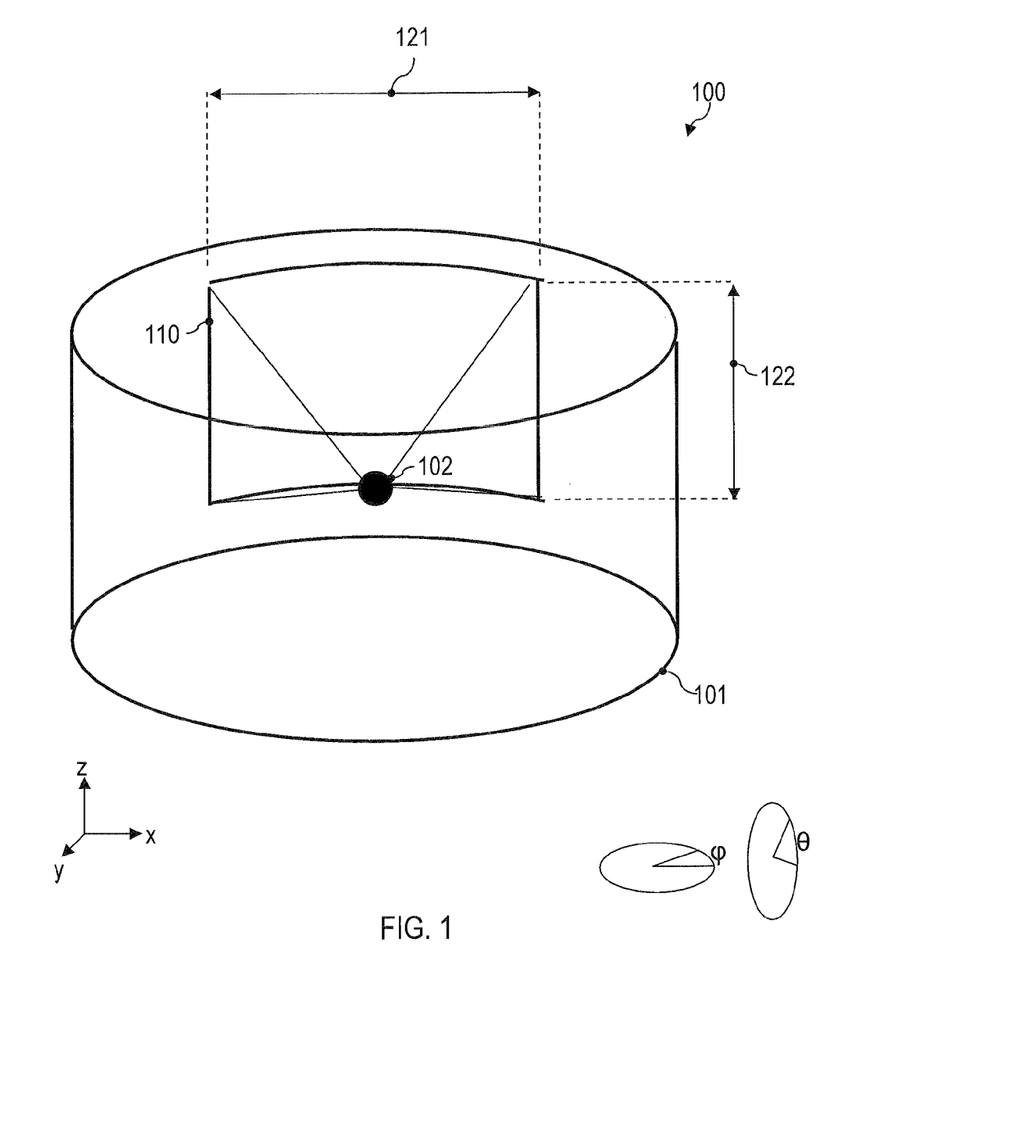
FIG. 1 illustrates a panoramic video imaging a surrounding of a detector of the panoramic video and further illustrates a view of the panoramic video.

In FIG. 1, a single frame 101 of the panoramic video 100 is illustrated schematically. As can be seen from FIG. 1, the panoramic video 100 images a first part of a surrounding of a detector 102 of the panoramic video 100. In the scenario of FIG. 1, the surrounding imaged by the panoramic video 100 extends 360 degrees along an azimutal angle $\phi$. Along a polar angle $\theta$, the panoramic video extends approximately +/−30 degrees. In general, it is possible that the panoramic video 100 images larger or smaller parts of the surrounding of the detector 102. It is not necessary that the panoramic video 100 images full 360 degrees of the surrounding of the detector 102. In general, it is also possible that the panoramic video 100 images 360 degrees along, both, the polar angle $\theta$ and the azimutal angle $\phi$. E.g., $\phi \geq 180°$, preferably $\phi \geq 220°$, more preferably $\phi \geq 300°$. E.g., $\theta \geq 30°$, preferably $\theta \geq 100°$, more preferably $\theta \geq 240°$. Above, the dimensions of the surrounding imaged by the panoramic video 100 have been specified in terms of the azimutal angle $\phi$ and the polar angle $\theta$; however, as indicated in FIG. 1, likewise it would be possible to specify the dimensions of the surrounding imaged by the panoramic video 100 in terms of a Cartesian coordinate system employing the coordinates x, y, z; e.g. the first part of the surrounding imaged by the panoramic video 100 could be specified in terms of dimensions parallel to a left-right orientation and dimensions perpendicular to the left-right orientation. Any other reference coordinate system may be employed. Furthermore, the angles may be variable and may be set or adjusted by a user, for example, depending on his or her needs.

Further illustrated in FIG. 1 is a view 110 employed for playback of the panoramic video 100. As can be seen from FIG. 1, the view 110 images a second part of the surrounding of the detector 102 of the panoramic video 100. The first part of the surrounding imaged by the panoramic video 100 is larger than the second part and includes the second part. The first part includes the second part.

Determining the view 110 which is smaller than the entire surrounding imaged by the panoramic video 100 may be convenient when playing back the panoramic video 100 on a display device with limited dimensions, e.g., when playing back the panoramic video 100 employing a conventional 2d display device of a portable electronic equipment. By determining the view 110, it is possible to select a certain part of the surrounding which is relevant to the user; other parts imaged by the panoramic video may be omitted from playback in view of the technical constraints imposed by the display device.

Figure 2A:
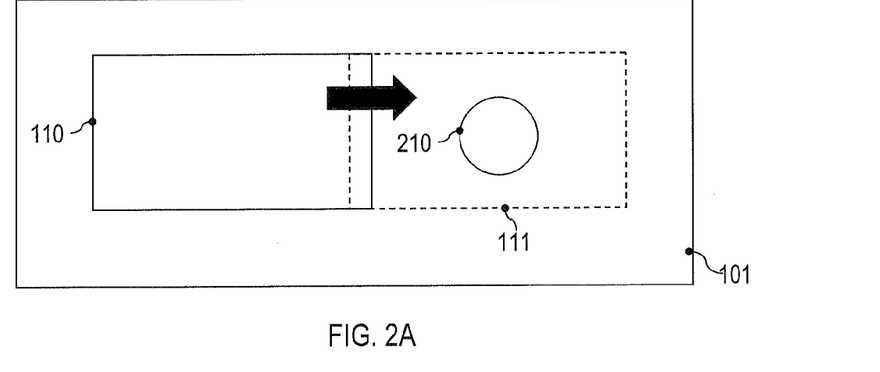
FIG. 2A illustrates play back of the panoramic video with a certain view and further illustrates a sound source.

Hereinafter, details of techniques are illustrated which enable to determine the view 110 of the panoramic video 100 based on a preset view which is indicated by control data. Such a scenario is illustrated in FIG. 2a. In FIG. 2a, a frame 101 on the panoramic video 100 is shown (in FIG. 2A mapped into the 2d plane of the drawing). A sound source 210 is located in the surrounding of the detector 102 which is imaged by the panoramic video 100. Here, the preset view 111 includes the direction of the sound source 210. The view 110 does not include the direction of the sound source 210. To determine the preset view 111, it may be required to establish the direction of the sound source 210. Then, the preset view 111 can be determined such that it fulfils a predetermined geometrical relationship with the established direction of the sound source 210. In the scenario of FIG. 2A, this predetermined geometrical relation ship is: preset view 111 is centered on direction of the sound source 210.

As mentioned above, it is possible to establish the direction of the sound source 210; e.g., the direction of the sound source 210 can be established in terms of one or more of the reference coordinate systems discussed above with respect to FIG. 1. In general, various techniques or a combination of techniques may be employed for the establishing the direction of the sound source 210; e.g., it is possible that the establishing of the direction of the sound source 210 includes evaluating a plurality of audio tracks of the video data of the panoramic video 100. In other words, it is possible that the direction of the sound source 210 is established as part of post-processing of the video data. Alternatively or additionally, it is possible that the establishing of the direction of the sound source includes evaluating a plurality of audiotracks received from microphones of the detector 102. E.g. the detector 102 can include a plurality of microphones. Each one of the plurality of microphones may be oriented such that it faces a different part of the surrounding of the detector 102. Directional recording of the sound level in the surrounding of the detector 102 becomes possible. In other words, it is possible that the direction of the sound source 210 is established as part of the recording of the video data of the panoramic video 100.

Evaluating the plurality of audio tracks enables to establish the direction of the sound source 210. E.g., the evaluating can take into account the level of loudness of the audio tracks. E.g., a difference in loudness of the various audio tracks may allow to conclude that the sound source 210 is located in a direction facing (remote of) a direction associated with the louder (quieter) audio track. Alternatively or additionally, the evaluating can also take into account a time shift of a sound pattern between the plurality of audio tracks. Techniques of directional recording may be employed.

Once the direction of the sound source 210 has been established, it is possible to determine the preset view 111. E.g., the preset view 111 may include the established direction of the sound source 210 (cf. FIG. 2A). It is possible that the preset view 111 is centered on the established direction.

It is also possible to determine the control data. The control data indicates the preset view of 111 the panoramic video 100. The control data can indicate the preset view 111 implicitly or explicitly. In a simple scenario, the control data implicitly indicates the preset view 111 by specifying the direction of the sound source 210; e.g., together with predefined rules or parameters such as dimensions, an aspect ratio, etc. of the preset view 111, it is then possible to unambiguously determine the preset view 111. The preset view 111 can also be explicitly specified by the control data, e.g., in terms of a center position, a zoom factor, and/or an aspect ratio of the preset view 111. Such parameters may enable to determine a shape of the preset view 111. The control data can further specify a vertical orientation and/or a horizontal orientation of the preset view 111, e.g., in the x,y,z-coordinate system; alternatively or additionally, the control data can specify the orientation of the preset view 111 in terms of the azimuthal angle $\phi$ and/or the polar angle $\theta$. Such parameters may enable to determine a position and orientation of the preset view 111.

The process for determining the preset view 111 may be variable and, for example, may be adjusted or chosen by a user depending on his or her needs, e.g., according to one of the above embodiments or a combination thereof.

After determining the preset view 111, it is then possible to store the control data indicating the preset view and the video data of the panoramic video 100 in a memory. Then, when playback of the panoramic video 100 is desired, both, the control data and the video data, may be retrieved from the memory for playback.

As will be appreciated, storing an entire frame 101 of the panoramic video 100 in the memory requires significant memory space. In particular, as the panoramic video 100 images a significant first part of the surrounding of the detector 102, the video data of a frame 101 of the panoramic video 100 may be comparably larger than video data of a conventional 2d video imaging a significantly smaller part of the surrounding of a respective detector. To reduce memory requirements, it is possible that the video data of only the preset view 111 is stored in the memory. It is possible that the remainder of the video data of the panoramic video 100 is discarded. I.e., it is possible that the part of the video data of the panoramic video 100 is discarded which does not image the second part of the surrounding of the detector 102.

Figure 2B:
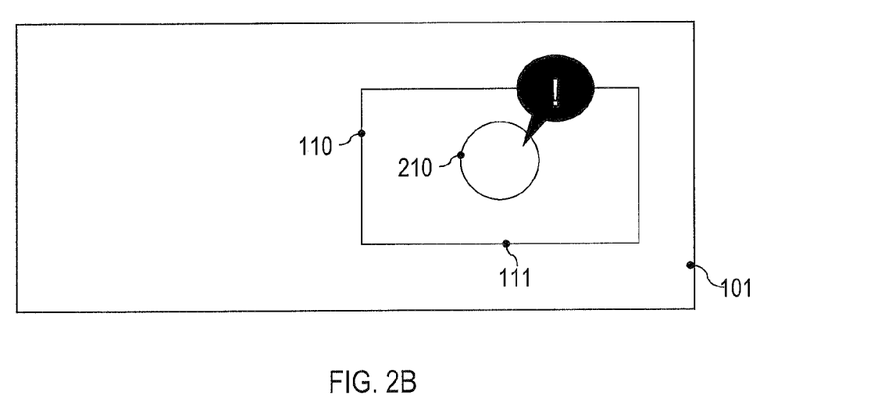
FIG. 2B corresponds to the scenario of FIG. 2A at a point in time where the sound source provides a comparably high audio level.

When playing back the panoramic video 100, it is possible to determine the view 110 employed for the playback based on the control data—respectively, based on the preset view 111. In the scenario of FIGS. 2A, 2B, this is done in a manner such that at a point in time when a sound level of the sound source 210 reaches a maximum (indicated in FIG. 2B with the exclamation mark), the view 110 is coincident with the preset view 111. For this, panning of the view 110 commences a certain time before the sound level reaches the maximum. The panning employs panning parameters (indicated in FIG. 2A with the horizontal full arrow). The panning parameters may be predefined and/or based on a user input. It is also possible that the panning parameters are included in the control data. To provide the panning in a controlled manner, it is possible that the view 110 is determined based on the panning parameters and a time evolution of the view, i.e., determined based on at least on one previously determined view 110 and the preset view 111. By considering the previously determined view 110, a change of the view per time can be tailored in accordance with the panning parameters.

In general, the view 110 can be determined to include the sound source 210 at a point in time when the audio level exceeds a threshold value. E.g., the threshold value may be predefined and set to a fixed value. It is also possible that the threshold value is determined based on a time evolution of the sound level; e.g., the threshold value may correspond to a moving average of the sound level. Thereby, it becomes possible to identify the maximum of the sound level. Such scenarios have the effect that it is ensured that the view includes the sound source 210 at a point in time when increased audio dynamics occur. This may ensure that relevant information is not lost due to playback of the panoramic video 100 with a size-limited view 110.

In a further scenario, it is possible that a further preset view is retrieved from a user input. The view 110 can then be determined as the further preset view in response to the retrieving of the user input. In other words, it is possible that the user manually overrides the determining of the view 110 based on the preset view 111 by specifying the further preset view. E.g., for this purpose, a user may employ a user interface such as a touch-sensitive display, a mouse, a keyboard or the like. The user may, e.g., employ a gesture input to scroll the view 110 away from the preset view 111. Then, once the user stops manually defining the view 110 by inputting the further preset view, it is possible that the view 110 pans back until it coincides with the preset view 111. E.g., it is possible that the view 110 is determined as the preset view 111 at a predefined time period after retrieving the user input. This predefined time period may amount to, e.g., 10 seconds. This interplay between the user input and the preset view 111 determined based on the established direction 210 may occur in a fashion known as rubber band scrolling. Such techniques enable, both, user-defined playback of the panoramic video 100, as well as controlled playback based on the preset view 111.

In general, it is possible that the control data indicates a plurality of preset view 111 of the panoramic video 100. It is possible that the determining of the view 110 of the panoramic video is further based on a user input which selects a particular one of the plurality of preset views 111. E.g., it may be possible that a user toggles through the plurality of preset views 111. E.g., upon retrieving a respective user input, the view 110 may be determined to coincide with the next one of the plurality of preset views 111. When switching to the next one of the plurality of preset views 111, predefined panning parameters may be employed for smooth panning of the view 110.

In the scenarios of FIG. 2a, 2b, it is possible that the control data further includes an audio level of the sound source. It is then possible, when playing back the panoramic video 100, to determine the view 110 as illustrated above.

In various scenarios as mentioned above, a certain amount of decision logic is employed when playing back the panoramic video 100; a particular geometrical relationship between the view 110 and the preset view 111 is determined when playing back the panoramic video 100. This may be based on panning parameters, a time evolution of the view 110, a selected one of a plurality of preset views 111, and/or user input, etc. However, as mentioned above in a simple scenario, the view 110 may be coincident with the preset view 111. In particular, in such a scenario it may be possible to employ all or most of the decision logic when determining the control data. When playing back the panoramic video 100, it may then be unnecessary to provide significant computational resources for the determining of the view 110. In this light and in more general words, the determining of the control data can be further based on the audio level of the sound source 210; and/or a time evolution of the preset view 111; and/or a predefined panning parameter. In particular, in such a case it may be possible to control the panning of the view 110 by respectively specifying a time evolution or time series of a the preset view 111; the view 110 may then following the preset view 111 in a one-to-one relationship.

When determining the view 110 and/or the preset view 111 based on a time evolution of the view 110 and/or a time evolution of the preset view 111 smooth and controlled panning may be ensured. For this purpose, the panning parameters may be taken into account.

In general, the control data may be determined with a predefined temporal resolution; e.g., the control data may indicate the preset view 111 for at least some of the plurality of frames 101 of the panoramic video 100. This resolution of the frames 101 of the panoramic video 100 for which the control data indicates the preset view 111 may correlate with the predefined temporal resolution; e.g., the control data may indicate the preset view 111 for every frame 101, for every second frame 101, for every third frame 101, and so forth.

Figure 3:
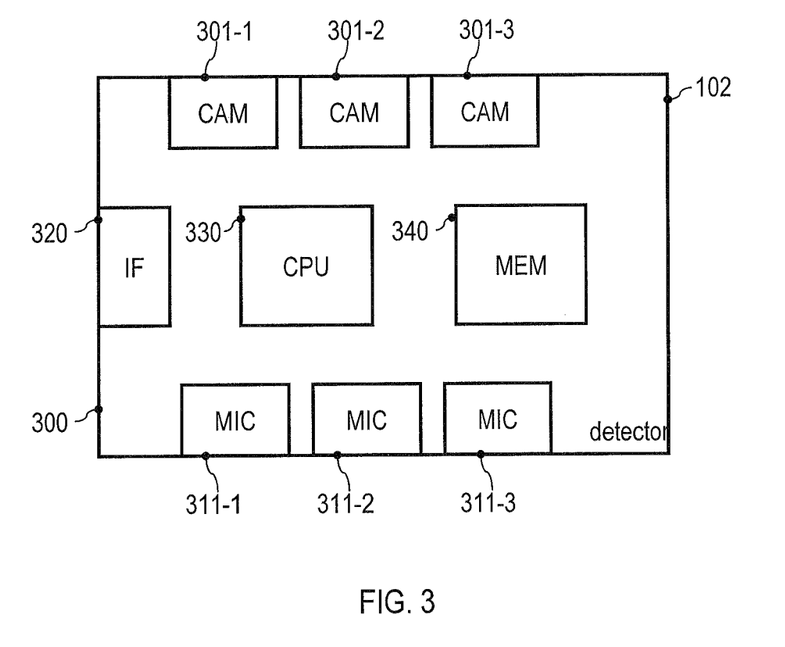
FIG. 3 is a schematic representation of a detector for acquiring a panoramic video according to various embodiments.

In FIG. 3, the device in form of detector 102 is shown in greater detail. The detector 102 includes a plurality of cameras 301-1-301-3. I.e., the various cameras 301-1-301-3 may be oriented in different directions to fully image the first part of the surrounding of detector 102. The detector 102 further includes a plurality of microphones 311-1-311-3, the microphones 311-1-311-3 may be oriented in different directions with respect to detector 102 to cover sound sources 210 located at various directions in the surrounding of the detector 102. The detector 102 further includes a processor 330 which is configured to execute various tasks with respect to processing of the panoramic video 100. In particular, the processor 330 can be configured to retrieve video data from each one of the plurality of cameras 301-1-301-3 and establish the video data of the panoramic video 100. This may include techniques of stitching of the individual video data retrieved from the cameras 301-1-301-3. Further, the processor 330 is configured to establish the direction of the sound source 210 located in the surrounding of the detector 102. This may be based on evaluating the audio level and/or based on techniques of directional recording. The techniques of direction recording may be based on a difference of a time of travel of sound waves originating from the sound source 210 to each one of the microphones 311-1-311-3. The processor 330 is further configured to determine the preset view 111 and the control data. For this, the processor 330 takes into account the direction of the sound source 210.

Further, the detector 102 includes a memory 340. The memory 340 can be volatile or non-volatile memory. The memory 340 can be employed in various ways. E.g., the memory 340 can include control instructions which can be executed by the processor 330 to perform the tasks regarding video processing as mentioned above. Further, the processor 330 can be configured to store the video data of at least the preset view 111 of the panoramic video 100 in the memory 340. Further, the processor 330 can be configured to store the control data in the memory 340.

It is possible that the detector 102 includes a user interface (not shown in FIG. 3). A user input may be received via the user interface and output may be provided to a user via the user interface. Thereby, it becomes possible to allow a user to manually set some or all parameters of the processing of the panoramic video as outlined above. The user interface may include a keyboard, a mouse, a touch sensitive display, speech recognition, gesture recognition, and/or a display, etc.

It is possible that the detector 102 includes a display device (not shown in FIG. 3) which is configured to play back the panoramic video 100. In such a case, the processor 330 can be further configured to determine the view 110 of the panoramic video 100 based on the preset view 111. In general, there may be a significant time difference between the time of recording of the panoramic video 100 and the time of playing back the panoramic video 100.

However, it is also possible that the detector 102 does not include a display device for playing back the panoramic video 100. In such a scenario, it may be desirable that the detector 102 includes an interface 320. The interface 320 may be configured to output the video data and the control data.

Figure 4:
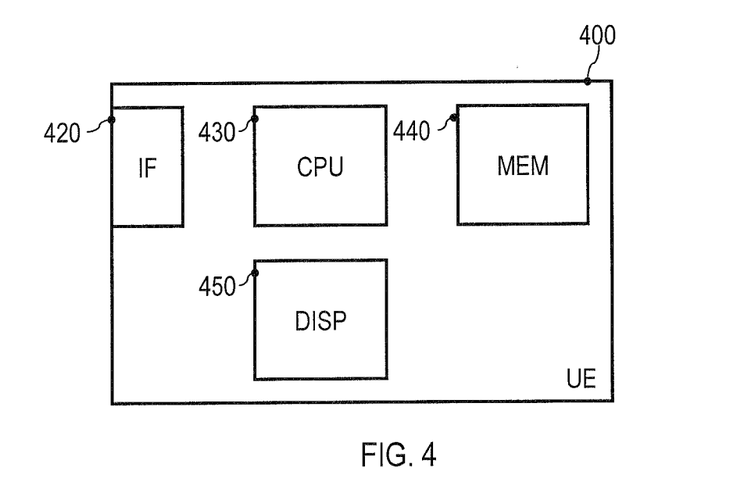
FIG. 4 is a schematic representation of a portable user equipment comprising a display device for playback of the panoramic video.

E.g., the control data and the video data of the panoramic video 100 can be output to a portable electronic equipment 400 (cf. FIG. 4). Examples for portable electronic equipments which may be configured as described herein include, but are not limited to, a cellular phone, a cordless phone, a personal digital assistant (PDA), a mobile computer, and the like. The portable electronic equipment includes an interface 420 for this purpose of receiving the video data of the panoramic video 100 and for receiving the control data. Further, the portable electronic equipment 400 includes a processor 430 which can be configured to execute various tasks with respect to the playing back of the panoramic video 100 on a display device 450. Respective control instructions may be provisioned in a volatile or non-volatile memory 440. E.g., the processor 430 can be configured to determine the view 110 of the panoramic video 100 based on the preset view 111 indicated in the control data retrieved via the interface 420.

Depending on the particular information specified by the control data, it is possible that a larger (smaller) amount of decision logic is implemented by the processor 330 of the detector 102 (the processor 430 of the portable electronic equipment 400)—or vice versa. I.e., in a scenario where the processor 340 of the detector 102 determines the control data such that it explicitly determines the preset view 111, it is possible that the processor 430 of the portable electronic equipment 400 sets the view 110 to coincide with the preset view 111. This may not require significant computational resources. The processor 330 of the detector 102 can take into account various panning parameters to specify a suitable time evolution of the preset view 111 and thereby of the view 110. In such a scenario, most decision logic resides in the detector 102. In a further scenario, it is possible that the processor 340 of the detector 102 merely specifies the direction of the sound source 210 as part of the control data, thereby implicitly indicating the preset view 111. Then, the processor 430 of the portable electronic equipment 400 can be configured to determine the view 111 based on certain geometrical relationships with respect to the direction of the sound source 210. In such a case, most of the decision logic resides in the portable electronic equipment 400.

Figure 5:
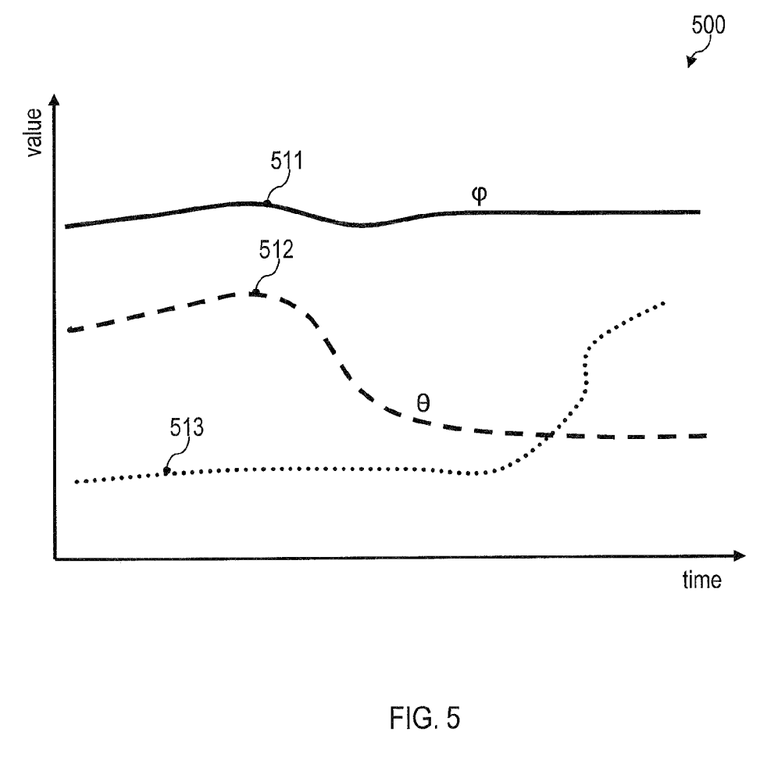
FIG. 5 illustrates control data indicating a view of the panoramic video as a function of time.

In FIG. 5, a time evolution of parameters of the preset view 111 specified by the control data 500 are illustrated. In FIG. 5, a scenario is shown where the control data explicitly indicates the preset view 111. In FIG. 5, the azimutal angle $\phi$, 511 is shown as a function of time (full line in FIG. 5); the azimutal angle $\phi$, 511 does not vary significantly as a function of time. Further, in FIG. 5, the polar angle $\theta$, 512 is shown (dashed line in FIG. 5); the polar angle $\theta$, 512 varies significantly as a function of time. This may be due to, e.g., a change in the orientation in the detector 102 and/or a movement of the sound source 210. The parameters 511, 512 specify an orientation of the preset view 111 within a respective reference coordinate system.

Further shown in FIG. 5 is a parameter 513 which specifies dimensions of the preset view 111. E.g., the parameter 513 can specify a zoom factor of the preset view 111; i.e., the larger (the smaller), the zoom factor 513, the smaller (the larger) the second part of the surrounding of the detector 102 imaged by the preset view 111. As can be seen from FIG. 5, at a certain point in time, the zoom factor 513 increases. This may be due to, e.g., a change in the sound level of the sound source 210. E.g., a smaller (larger) sound level may correspond to a smaller (larger) zoom factor 513.

Figure 6:
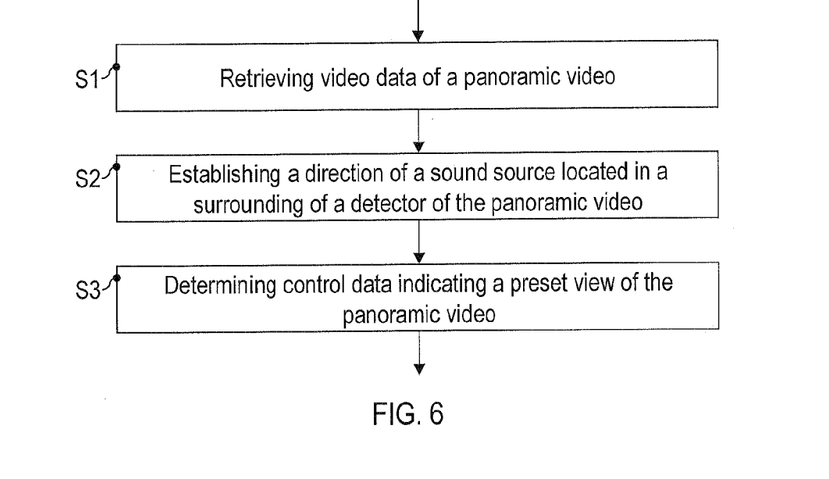
FIG. 6 is a flowchart of a method of processing a panoramic video according to various embodiments.

In FIG. 6, a flowchart of a method of processing a panoramic video 100 is shown. First, in step S1, the video data of the panoramic video 100 is retrieved. Here, the video data may be retrieved from some memory or may be retrieved from the cameras 301-1-301-3 of the detector 102. Next, in step S2, the direction of the sound source 210 is established. Step S2 can occur based on raw audio data of audio tracks retrieved from the microphones 311-1-311-3 of the detector 102. It is also possible that the direction of the sound source 210 is established in step S2 as part of post-processing of audio tracks of the pre-recorded video data of the panoramic video 100. Then, in step S3, the control data 500 indicating the preset view 111 is determined. This is based on the direction of the sound source 210 established in step S2.

In general, it is possible that in step S2, directions for a plurality of sound sources are established. It is then possible to determine the control data 500 for each one of the plurality of sound sources 210 individually in step S3. E.g., when playing back the panoramic video 100, it is possible to determine the view 110 such that includes a particular one of the plurality of sound sources 210. E.g., the view 110 can be determined such that it includes the sound source 210 associated with the highest sound level of all sound sources 210. However, it would also be possible to determine the control data 500 in step S3 by pre-selecting a particular one of the plurality of sound sources 210. E.g., the various sound sources 210 can be included in the preset view 111 in a fixed sequence; the preset view 111 may be panned from sound source 210 to sound source 210 after fixed time intervals. For this, the preset view 111 may be determined based on certain panning parameters and taking into account a time-evolution preset view 111. As can be seen, various approaches exist to take into account a plurality of sound sources 210 located in various directions of the surrounding of the detector 102.

Figure 7:
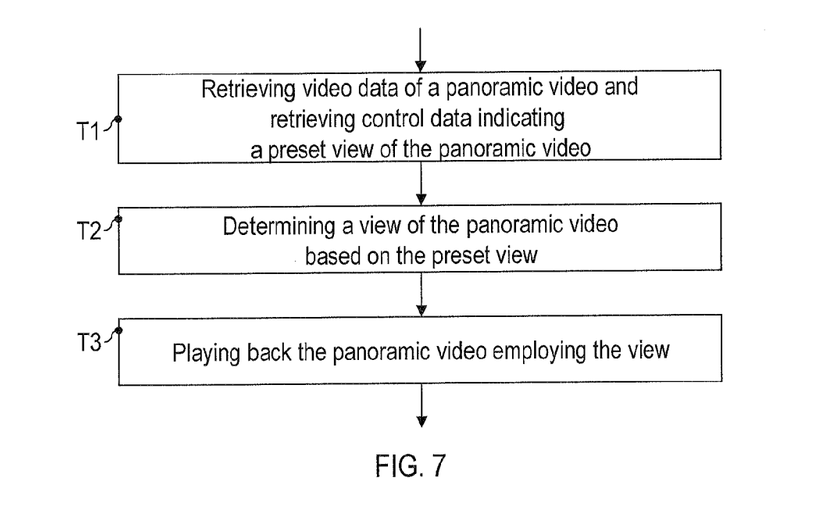
FIG. 7 is a flowchart of a method of playing back a panoramic video according to various embodiments.

In FIG. 7, a flowchart of the method of playing back the panoramic video 100 according to various embodiments is illustrated. In step T1, the video data of the panoramic video 100 is retrieved. Further, the control data 500 is retrieved. The control data 500 indicates the preset view 111.

Then, in step T2, the view 110 of the panoramic video 100 is determined based on the preset view 111. Depending on the depth of information with which the preset view 111 is indicated in the control data 500, more or fewer computational resources may be required to execute step T2. In a simple scenario, in step T2, the view 110 is determined such that it coincides with preset view 111; here, the preset view 111 may be explicitly indicated in the control data 500. In step T3, playback of the panoramic video 100 is executed.

Although certain embodiments have been shown and described, it is understood that equivalents and modifications falling within the scope of the appended claims will occur to others who are skilled in the art upon the reading and understanding of this specification.

E.g., while above scenarios have been illustrated where the preset view and the view are determined such that they include and are centered on the established direction of the sound source, in general it is also possible that the preset view and/or the view fulfill different geometric relationships with respect to the established direction.

E.g., while above scenarios have been illustrated where the portable electronic equipment employed for playing back the panoramic video and the detector employed for capturing the panoramic video and determining the control data are separate devices, it is possible that the portable electronic equipment and the detector are integrated in a single entity.

The invention claimed is:
1. A method of processing a panoramic video, comprising:
retrieving video data of a panoramic video, the panoramic video imaging a first part of a surrounding of a detector of the panoramic video;
establishing a direction of a sound source located in the surrounding of the detector;
based on said establishing of the direction of the sound source, determining control data indicating a preset view of the panoramic video, the preset view imaging a second part of the surrounding of the detector, the first part including the second part; and storing, in computing memory, a portion of the video data containing the preset view of the panoramic video, and absent storing, in the computing memory, a remaining portion of the video data outside the second part of the surrounding of the detector to discard the remaining portion.

2. The method of claim 1, wherein said establishing of the direction of the sound source comprises:

evaluating at least one of a plurality of audio tracks of the video data, and a plurality of audio tracks received from microphones of the detector.

3. The method of claim 2, wherein said evaluating takes into account at least one of a level of loudness of the plurality of audio tracks, and a time shift of a sound pattern between the plurality of audio tracks.

4. The method of claim 1, wherein the preset view includes the established direction of the sound source.

5. The method of claim 1, wherein the determining of the control data is further based on at least one of the following: an audio level of the sound source; a previously determined preset view; and a predefined panning parameter.

6. The method of claim 1, wherein the control data specifies at least one of the following parameters of the preset view: a direction of the sound source; a center position; a zoom factor; an aspect ratio; a vertical orientation; a horizontal orientation; an azimuthal angle $\phi$; and a polar angle $\theta$.

7. The method of claim 1, wherein the control data indicates an audio level of the sound source.

8. The method of claim 1, wherein the control data is determined with a predefined temporal resolution.

9. The method of claim 1, wherein the control data indicates a zoom factor of the preset view, wherein the zoom factor depends on the sound level of the sound source.

10. The method of claim 1, wherein the method is performed during a capturing of the panoramic video.

11. A device, comprising:

a processor operating under computer program instructions control, the processor:

retrieving video data of a panoramic video, the panoramic video imaging a first part of a surrounding of a detector, establishing a direction of a sound source located in the surrounding of the detector, determining control data indicating a preset view of the panoramic video based on said establishing of the direction of the sound source, wherein the preset view images a second part of the surrounding of the detector, the first part including the second part, and storing, in computing memory, a portion of the video data containing the preset view of the panoramic video, and absent storing, in the computing memory, a remaining portion of the video data outside the second part of the surrounding of the detector to discard the remaining portion.

12. The device of claim 11, wherein the processor: establishing the direction of the sound source by evaluating at least one of a plurality of audio tracks of video data, and a plurality of audio tracks received from microphones of the detector.

13. The device of claim 12, wherein the processor: evaluating the at least one of the plurality audio tracks of the video data, and the plurality of audio tracks received from the microphones by taking into account at least one of a level of loudness of the plurality of audio tracks, and a time shift of a sound pattern between the plurality of audio tracks.

14. The device of claim 11, wherein the preset view includes the established direction of the sound source.

15. The device of claim 11, wherein the processor: determining the control data based on at least one of the following: an audio level of the sound source; a previously determined preset view; and a predefined panning parameter.

16. The device of claim 11, wherein the control data specifies at least one of the following parameters: an audio level of the sound source; a direction of the sound source; a center position; a zoom factor; an aspect ratio; a vertical orientation; a horizontal orientation; an azimuthal angle $\phi$; and a polar angle $\theta$.

17. The device of claim 11, wherein the processor: determining the control data with a predefined temporal resolution.

18. The device of claim 11, wherein the control data indicates a zoom factor of the preset view, wherein the zoom factor depends on the sound level of the sound source.

* * * * *